July 23, 1968  W. G. FLANNELLY  3,393,555
VIBRATION TESTING AND ISOLATING APPARATUS
Filed June 1, 1965  4 Sheets-Sheet 1

FIG. 1

INVENTOR.
WILLIAM G. FLANNELLY
BY
McCormick, Paulding & Huber
ATTORNEYS

July 23, 1968    W. G. FLANNELLY    3,393,555
VIBRATION TESTING AND ISOLATING APPARATUS
Filed June 1, 1965    4 Sheets-Sheet 2

July 23, 1968 W. G. FLANNELLY 3,393,555
VIBRATION TESTING AND ISOLATING APPARATUS
Filed June 1, 1965 4 Sheets-Sheet 3

July 23, 1968     W. G. FLANNELLY     3,393,555

VIBRATION TESTING AND ISOLATING APPARATUS

Filed June 1, 1965     4 Sheets-Sheet 4

United States Patent Office 3,393,555
Patented July 23, 1968

3,393,555
VIBRATION TESTING AND ISOLATING
APPARATUS
William G. Flannelly, South Windsor, Conn., assignor to
Kaman Corporation, a corporation of Connecticut
Filed June 1, 1965, Ser. No. 460,248
11 Claims. (Cl. 73—71.6)

ABSTRACT OF THE DISCLOSURE

An apparatus for ground testing aircraft, spacecraft and the like to determine the effects of vibration consists of one or more vibration isolators interposed between the ground and the test specimen, for supporting the specimen, and having an antiresonant frequency at which a substantially zero vibrating force is transmitted from the specimen to the ground. A sensor detects one characteristic of the vibration of the test specimen, such as its frequency, and through an associated control tunes the antiresonant frequency of the isolators in accordance with the detected characteristic.

---

This invention relates to vibration testing equipment, and deals more particularly with apparatus for vibration testing a test specimen on the ground so as to remove the influence or coupling effect of the devices required for supporting the test specimen against the force of gravity and/or for otherwise restraining it relative to the test fixture.

One problem encountered in on-ground vibration testing is that the support or mount to which the specimen is attached often greatly influences the modes of vibration of the specimen. This is a very obvious problem in shake testing of aircraft or spacecraft for the purpose of determining and investigating the normal modes of vibration of the specimen in flight. Since the testing is generally performed on the ground, some means are necessary for supporting the specimen against the force of gravity and for otherwise restraining it relative to the test equipment. As a result of this, in the equipment presently used, the mass and stiffness of the supports is effectively added to the specimen and changes its vibration characteristics. On the test mount the test specimen therefore does not react to vibrations in exactly the same manner as it would in free flight. The same problem also arises in component testing in which the so-called "uncoupled natural frequencies" of components are sought.

The general object of this invention is to provide a means for supporting a vibration test specimen which means avoids the above problem. More particularly, the general aim of this invention is to provide a vibration test specimen support or mount which has little or no influence on the vibration of the specimen so as to allow the duplication of in-flight or uncoupled modes of vibration in ground tests.

Another object of this invention is to provide a vibration test mount or support of the character mentioned in the preceding paragraph which is capable of statically supporting a test specimen, but which at the test frequency provides a zero impedance between the specimen and the ground so that the equations of motion governing the specimen are identical to the equations of motion for an unrestrained specimen.

A further object of this invention is to provide a vibration mount or support which is usable with different form blocks, attachments, etc. for connecting differently shaped and sized specimens to the mount and which is tunable to "tune-out" the effects, referred to as "tare effects," of such form blocks and the like.

A still further object of the invention is to provide a zero impedance test mount which is capable of operation over a wide frequency range of vibrations.

Other objects and advantages of the invention will be apparent from the following description and from the drawings forming a part hereof.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Figure 1:
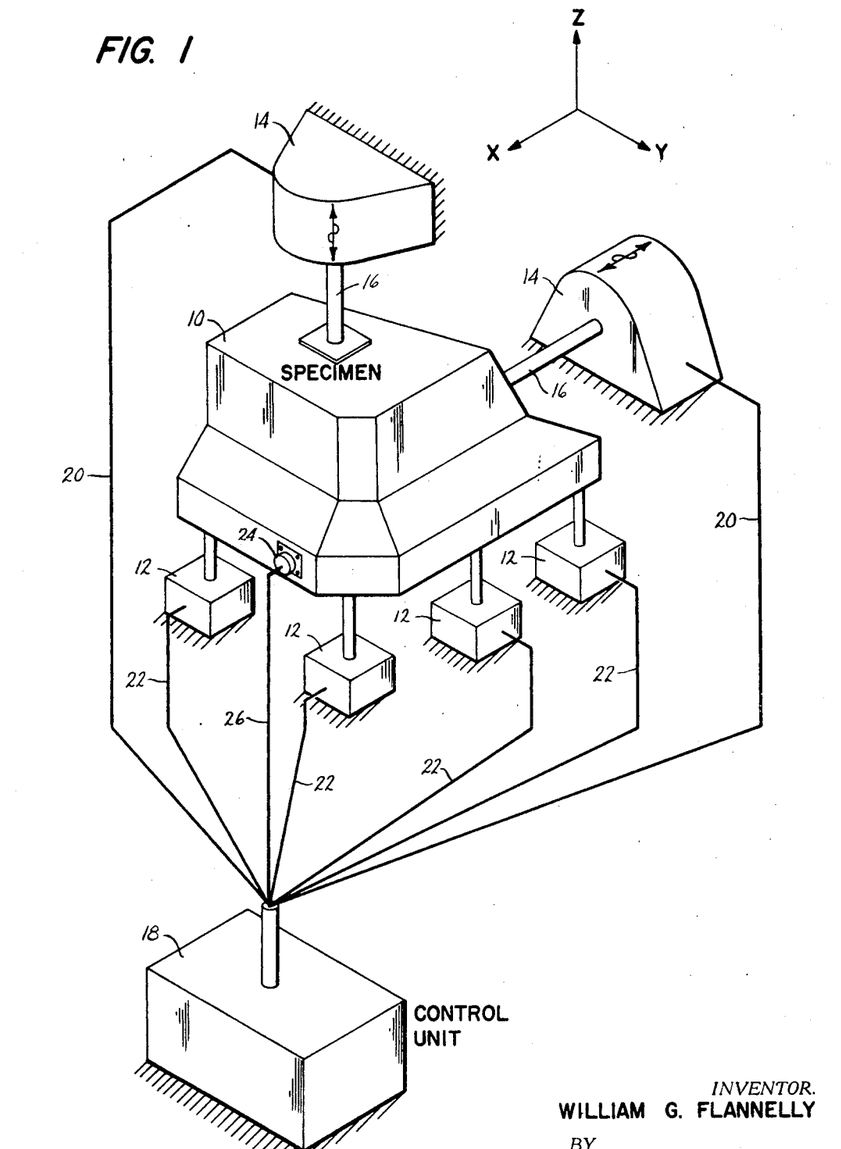
FIG. 1 is a schematic representation of a vibration test system utilizing equipment embodying the present invention.

Turning now to FIG. 1, this figure shows a vibration test system for shake testing a specimen on the ground. The specimen may comprise a complete unit such as an aircraft or spacecraft, or may comprise a sub-assembly or component of such a complete unit. In FIG. 1, the specimen as indicated generally at 10 and is supported from the ground by a number of test mounts 12, 12 which are constructed and arranged to permit the test specimen to move in at least two coordinate dimensions, these dimensions in the illustrated case being the dimension parallel to the Z axis and the dimension parallel to the X axis of the system of coordinate axes shown in the figure. The specimen is vibrated in these two dimensions by two shakers or oscillators 14, 14 each of which includes a reciprocating output element 16 attached to the specimen and arranged to vibrate the specimen in one direction. That is, one of the shakers 14 oscillates the specimen ni a direction parallel to the Z axis and the other shaker oscillates the specimen in a direction parallel to the X axis.

As explained in more detail hereinafter, the test mounts 12, 12 are tunable to the frequency of vibration of the test specimen 10, and when properly tuned provide a support for the specimen dynamically exhibiting substantially zero mass and stiffness so that the support has little or no effect on the dynamic response of the specimen to the vibrations imposed thereon by the shakers. The control of the shakers 14, 14 and the tuning of the test mounts 12, 12 is accomplished by means of a suitable control unit 18 which is connected to the shakers by control lines 20, 20 and to the test mount 12, 12 by control lines 22, 22. The control unit 18, may for example, comprise a console from which an operator can manually vary the output frequencies of the shakers 14, 14 and can manually vary the tuning of the test mounts 12, 12 in accordance with the shaker frequencies. Alternatively or additionally, the control unit 18 may also include equipment for automatically varying the frequencies of the shakers 14, 14 through a given test pattern or sequence and equipment for automatically tuning the test amounts 12, 12 in accordance with the actual frequency of vibration of the specimen as represented by some characteristic related to the frequency of vibration, such as a frequency related parameter of the command signals transmitted to the shakers over the lines 20, 20 or signals produced by a frequency detector 24 attached to the specimen 10 and connected to the control unit by a line 26.

Figure 2:
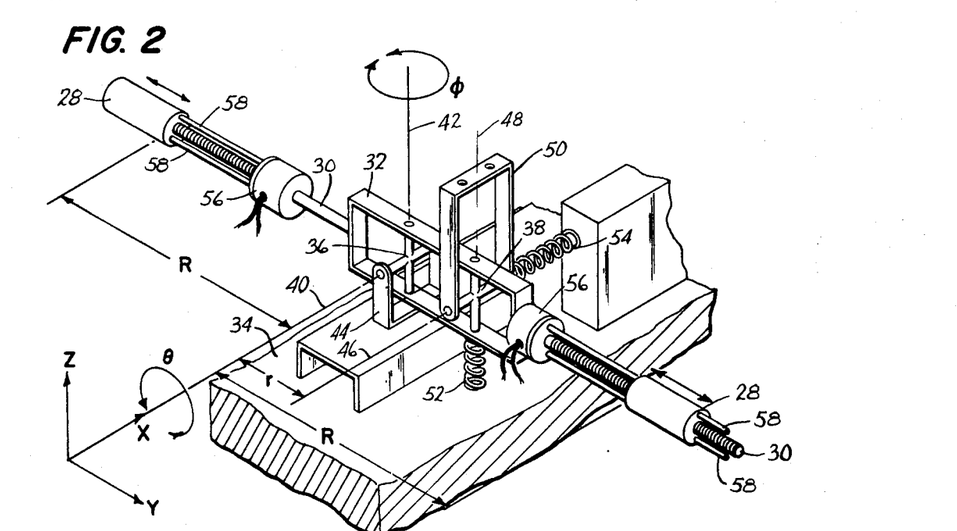
FIG. 2 is a perspective, and somewhat schematic, view of a test mount embodying one aspect of the present invention and suitable for use in the test system of FIG. 1.

Turning now to FIG. 2, this figure illustrates a mount capable of isolating vibrations occurring in two coordinate directions and suitable for use as one of the test mounts 12, 12 of the FIG. 1 system. Except for being tunable to various different excitation frequencies, the test mount of FIG. 2 is in many respects similar to the vibration isolator shown and described in my co-pending United States patent application, Ser. No. 408,543, filed Nov. 3, 1964, now Patent No. 3,322,379, and entitled "Dynamic Antiresonant Vibration Isolator," and reference is made to this co-pending application for a more detailed description of the operation of the test mount with regard to its ability to function as a vibration isolator. For the present, it is sufficient to note that the test mount of FIG. 2 comprises two auxiliary masses 28, 28 which are respectively received on two shafts 30, 30 extending outwardly in opposite directions from the two ends of a bracket or frame member 32.

The two auxiliary masses 28, 28 and the structure fixed relative thereto, such as the bracket 32 and the shafts 30, 30 form a composite mass which is moved relative to both the ground 34 and to the test specimen in response to vibration of the specimen relative to the ground in either of its two directions of vibration. To accomplish this motion, the mass supporting bracket 32 is connected to the ground by a universal joint 36 and is connected to the specimen by another universal joint 38. The universal joint 36 supports the bracket 32 for movement relative to the ground about a horizontal axis 40 and about a normally vertical axis 42, the two vertical arms of the cross member of the joint being pivotally connected with the bracket 32 and the two horizontal arms of the cross member of the joint being pivotally connected to a U-shaped bracket 44 which is fixed to the ground 34. The universal joint 38 connects the mass supporting bracket 32 to the specimen for relative rotation about a horizontal axis 46 and about a normally vertical axis 48, the two vertical arms of the cross member of the joint being pivotally connected with the bracket 32 and the two horizontal arms of the cross member of the joint being pivotally connected with a U-shaped bracket 50 which is fixed to the specimen 10. The two horizontal pivot axes 40 and 46 are spaced from one another by a distance $r$. The two auxiliary masses 28, 28 are spaced from the horizontal axis 40 by equal distances R, R so that the composite mass provided by the masses 28, 28 and their associated structure has a center of gravity generally coincident with the intersection point of the axes 40 and 42. This location of the center of gravity of the composite mass is not, however, essential and if desired the auxiliary masses may be so located as to cause the center of gravity to be spaced substantial distances from the axes 40 and 42. As shown in FIG. 2, rotation about the normally vertical axis 42 is represented by the angle $\phi$ and the rotation of a bracket 32 about the horizontal axis 40 is represented by the angle $\theta$.

Between the specimen and the ground are suitable spring means which resiliently resist movement of the specimen away from its at rest position in the two coordinate directions of movement of the test mount. When one of the directions of movement is the vertical direction, as in the illustrated case, the spring means also provides vertical static support for the specimen against the force of gravity. These spring means may be placed between the specimen and the ground at various different locations and may be made entirely separate from the auxiliary masses, 28, 28. Preferably, however, and as shown in FIG. 2, each test mount includes its own set of springs. In the test mount of FIG. 2, this set of springs includes a helical spring 52 which is located between the ground and the bracket 32 so as to resist movement of the bracket 32 in either direction about the horizontal axis 40 away from its at rest position and another helical spring 54 which is located between the ground and the bracket 32 so as to resist movement of the bracket 32 in either direction about the vertical axis 42 away from its at rest position. The spring 52 is aligned with the normally vertical pivot axis of the universal joint 38 and the helical spring 54 is aligned with the horizontal pivot axis 46. Therefore, each spring is essentially connected between the ground and the specimen even though it engages the bracket 32 rather than directly engaging the specimen.

As explained in my above-identified co-pending application, the dynamic effect of the auxiliary masses 28, 28 and the springs 52 and 54, when the specimen is vibrated in either or both of its two coordinate dimensions, is to produce at one frequency, referred to as the antiresonant frequency, a force transmissibility of zero between the specimen and the ground. In isolating vibrations occurring parallel to the X axis, the bracket 32 and auxiliary masses 28, 28 move about the axis 42 and in isolating vibrations occurring parallel to the Z axis, the bracket 32 masses 28, 28 move about the horizontal axis 40.

By varying the antiresonant frequency of the test mount of FIG. 2, the mount may be made to isolate various different frequencies of vibrations. Tuning of the FIG. 2 test mount to vary the antiresonant frequency is accomplished by varying the displacements of the masses 28, 28 from the pivot axes 40 and 42 of the universal joint 36 so as to in turn vary the moment of inertia of the composite mass about the axes 40 and 42. The movement of the masses 28, 28 along the shafts 30, 30 to provide for this adjustment may be accomplished in various different manners and in the illustrated case is accomplished, for example, by a threaded connection between each mass and its associated shaft 30. Carried by each shaft 30 is a reversible motor 56 having one part fixed to the shaft and having a movable part which rotates about the shaft and which carries two rods 58, 58 extending longitudinally of the shaft. The two rods 58, 58 of each motor are slidably received in openings passing through the associated mass 28 so that as the motor 56 is operated, the rods 58, 58 rotate the mass 28 to thread the mass in one direction or the other along the axis of the shaft. Therefore, by properly energizing the motors 56, 56 the masses 28, 28 may be moved to any position along the lengths of the shafts.

Figure 3:
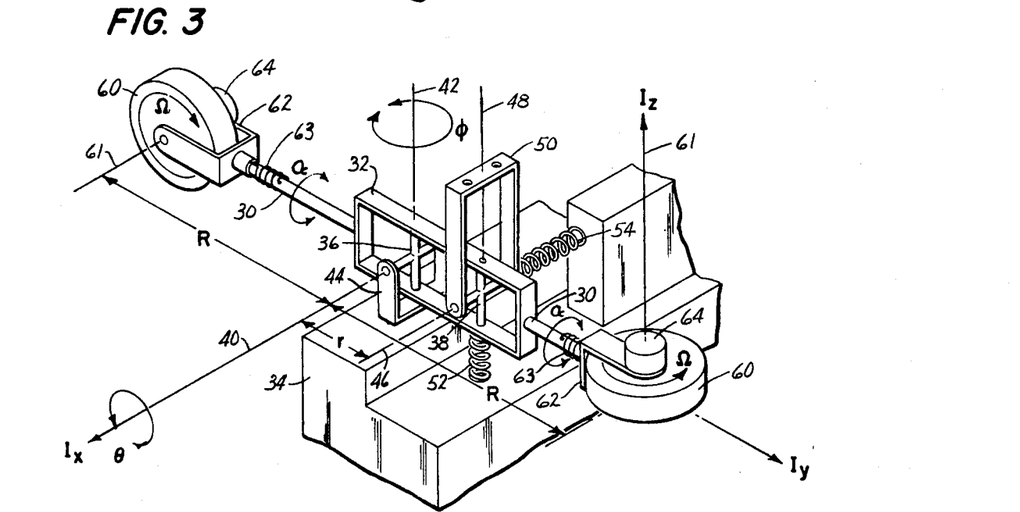
FIG. 3 is a perspective, and somewhat schematic, view of an alternative form of test mount also embodying one aspect of the present invention and suitable for use in the test system of FIG. 1.

FIG. 3 illustrates schematically another form of test mount capable of isolating vibrations occurring in two coordinate directions and which may be used as one of the test mounts 12, 12 of the FIG. 1 system. The FIG. 3 device is generally similar to that of FIG. 2 except for using gyroscopic masses 60, 60 in place of the axially movable masses 28, 28 of the FIG. 2 device. Parts of the FIG. 3 device which are similar to the FIG. 2 device have been given similar reference numerals and need not be redescribed. In the FIG. 2 device, the auxiliary masses 28, 28 have an inertia effect on the device and the magnitude of this inertia effect is varied by moving the masses toward or away from the pivot axes 40 and 42. In the FIG. 3 system, the gyroscopic masses 60, 60 produce an equivalent inertia effect and the magnitude of the inertia effect is varied by varying the angular velocity Ω of each disc. As shown in FIG. 3, each gyro disc or mass 60 is attached to the associated shaft 30 by a bracket 62 which rotatably supports the associated gyro disc for rotation relative thereto about an axis 61 and which in turn is rotatable about the axis of the associated shaft as indicated by the angle α. The two axes 61, 61 are also, for convenience, spaced equal distances R, R from the pivot axis 40, but this equal spacing is not essential. A suitable biasing means, such as a helical torsion spring 63, is provided for each bracket 62 for lightly biasing the bracket to a given neutral position. In FIG. 3, the two brackets 62, 62 are shown in their respective neutral positions, and when in such positions it will be noted that the axes 61, 61 of rotation of the two gyro discs are oriented at 90° to each other and respectively parallel to the axes 40 and 42. As so arranged, the gyro disc 60 having its axis 61 of rotation parallel to the pivot axis 40 is effective to produce an inertia effect for isolating vibrations producing movements about the pivot axis 40 and the gyro disc having its axis 61 of rotation parallel to the pivot axis 42 is effective to produce an inertia effect for isolating vibrations producing movements about the pivot axis 42. That is, as the shaft 30 pivots about the axis 40 and moves the left hand gyro disc 60 of FIG. 3 up and down, the gyroscopic effect of this gyro disc causes it and its bracket 62 to rotate back and forth on the shaft 30 and to exert a force or inertia effect on the shaft 30 having the same effect on the shaft 30 as would a large mass fixed to the end of the shaft and moved in the same manner. Likewise, as the shaft 30 pivots about the axis 42 and moves the right hand gyro disc 60 of FIG. 3 laterally back and forth, the gyroscopic effect of this gyro disc causes it and its bracket 62 to rotate back and forth on the shaft 30 and to likewise exert a force or inertia effect on the shaft 30 simulating the effect of a large mass fixed to the end of the shaft and moved in a like manner. Attached to each bracket 62 is a variable speed motor 64 for rotating the associated gyro disc.

Figures 4A, 4B:
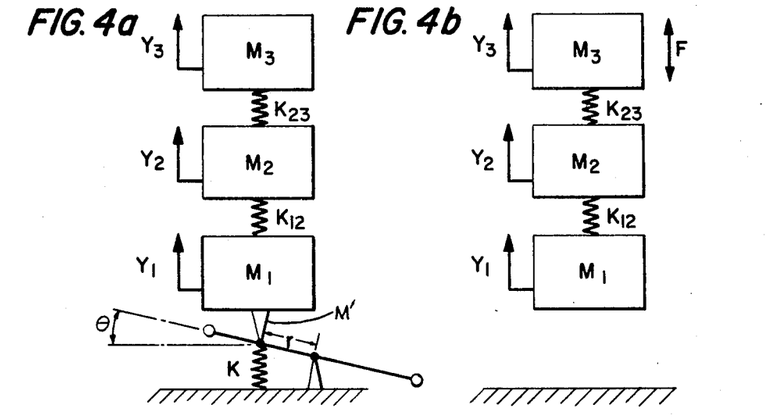
FIGS. 4a and 4b are schematic representations of two similar series connected systems of masses and springs, the system of FIG. 4a being dynamically restrained by a mount similar to that of FIG. 2 and the system of FIG. 4b being dynamically unrestrained.

The effects of the test mounts shown in FIGS. 2 and 3 may be further explained by reference to FIGS. 4a and 4b and FIGS. 5a and 5b. Considering first FIGS. 4a and 4b, FIG. 4a represents schematically a test specimen supported by a mount similar to that of FIG. 2 and consisting of a number of masses $m_1$, $m_2$, $m_3$ connected in series with one another by springs. The spring between the masses $m_1$, $m_2$ has a spring constant $K_{12}$ and the spring between the masses $m_2$ and $m_3$ has a spring constant $K_{23}$. The mass indicated at $m'$ represents the "tare" mass, that is, the mass of the contour blocks and/or other parts used to hold the test mount to the specimen. A vibrating force F is applied to the mass $m_3$ and acts in the vertical direction at a frequency $\omega$. The displacements of the masses as a result of this force are represented respectively by $y_1$, $y_2$ and $y_3$. For simplicity in the mathematical analysis of the system of FIG. 4a, the auxiliary masses of the test mount are so arranged so that the center of gravity of the auxiliary masses and their supporting structure is located on the pivot axis of the auxiliary masses relative to the ground. The moment of inertia of the auxiliary masses and their supporting structure about this pivot axis is represented by I. The spring between the mass $m_1$ and the ground has a spring rate K, and the rotation movement of the arm is relatively small so that $$\theta \cong \frac{y_1}{r}$$

The system of masses and springs shown in FIG. 4b is similar to that of FIG. 4a except for dynamically being vertically unrestrained by any test mount or other structure.

In the test mount restrained system of FIG. 4a, the total kinetic energy of the system is:

$$T = \tfrac{1}{2} m_3 \dot{y}_3^2 + \tfrac{1}{2} m_2 \dot{y}_2^2 + \tfrac{1}{2} (m_1 + m^1) \dot{y}_1^2 + \tfrac{1}{2} \frac{I}{r^2} \dot{y}_1^2$$

In the unrestrained system of FIG. 4b, the total kinetic energy of the system is:

$$T = \tfrac{1}{2} m_3 \dot{y}_3^2 + \tfrac{1}{2} m_2 \dot{y}_2^2 + \tfrac{1}{2} m_1 \dot{y}_1^2$$

In the test mount restrained system of FIG. 4a, the total potential energy of the system is:

$$V = \tfrac{1}{2} K_{23}(y_3 - y_2)^2 + \tfrac{1}{2} K_{12}(y_2 - y_1)^2 + \tfrac{1}{2} + K y_1^2$$

In the unrestrained system of FIG. 4b, the total potential energy is:

$$V = \tfrac{1}{2} K_{23}(y_3 - y_2)^2 + \tfrac{1}{2} K_{12}(y_2 - y_1)^2$$

Using Lagrange's equation and assuming a solution of the form $y = Y e^{i\omega t}$, the equations of motion become:

For the restrained system of FIG. 4a $$\begin{bmatrix} K_{12} + K - \omega^2\left(m_1 + m^1 + \frac{I}{r^2}\right) & -K_{12} & 0 \\ K_{12} & K_{12} + K_{23} - \omega^2 m_2 & -K_{23} \\ 0 & -K_{23} & K_{23} - \omega^2 m_3 \end{bmatrix} \begin{bmatrix} y_1 \\ y_2 \\ y_3 \end{bmatrix} = \begin{bmatrix} 0 \\ 0 \\ F \end{bmatrix}$$

From this it will be noted that when $$\omega^2 = \frac{K r^2}{m^1 r^2 + I}$$

the equations of motion of the restrained system are identical to the equations of motion for the unrestrained system. Therefore, by properly selecting the moment of inertia I of the test mount the condition $$\omega^2 = \frac{K r^2}{m^1 r^2 + I}$$

may be satisfied for any frequency of vibration $\omega$ and any given tare mass $m'$, and when this condition is satisfied, the movements of the specimen in the restrained system will be identical to the movements of the specimen in the unrestrained system. Varying the moment of inertia I to satisfy the condition is referred to herein as "tunning" the test mount. When the test mount is properly tuned to the frequency of vibration it is therefore seen to exert a zero impedance on the test specimen.

Figures 5A, 5B:
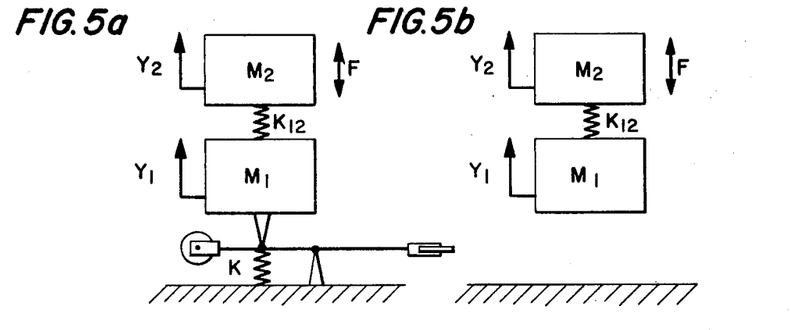
FIGS. 5a and 5b are schematic representations of two similar series connected systems of masses and springs with the system of FIG. 5a being dynamically restrained by a mount similar to that of FIG. 3 and with the system of 5b being dynamically unrestrained.

Considering next FIGS. 5a and 5b, FIG. 5a shows a specimen made up of masses $m_1$ and $m_2$ and an interposed spring of spring constant $K_{12}$ dynamically restrained in the vertical direction by a gyroscopic test mount generally similar to that of FIG. 3. FIG. 5b shows a similar specimen dynamically unrestrained in the vertical direction.

In the test mount restrained system of FIG. 5a, the total kinetic energy of the system is:

$$T = \tfrac{1}{2} I_z \left(\Omega + \frac{\dot{y}_1}{r} \sin \alpha\right) + \tfrac{1}{2} I_y \dot{\alpha}^2 + \tfrac{1}{2} I_x \frac{\dot{y}_1^2}{r^2} + \tfrac{1}{2} m_1 \dot{y}_1^2 + \tfrac{1}{2} m_2 \dot{y}_2^2$$

where $I_x$, $I_y$ and $I_z$ are moments of inertia as indicated in FIG. 3.

In the unrestrained system of FIG. 5b, the total kinetic energy of the system is:

$$T = \tfrac{1}{2} m_1 \dot{y}_1^2 + \tfrac{1}{2} m_2 \dot{y}_2^2$$

In the test mount restrained system of FIG. 5a the total potential energy of the system is:

$$V = \tfrac{1}{2} K_{12}(y_1 - y_2) + \tfrac{1}{2} K y_1^2$$

In the unrestrained system of FIG. 5b the total potential energy of the system is:

$$V = \tfrac{1}{2} K_{12}(y_1 - y_2)^2$$

The equations of motion of the test mount restrained system of FIG. 5a became:

$$\begin{bmatrix} K_{12}+K-\omega^2\left(\dfrac{I_x}{r^2}+m_1\right) & i\omega\dfrac{I_z}{r}\Omega & -K_{12} \\ i\omega\dfrac{I_z}{r}\Omega & -\omega^2 I_y & 0 \\ -K_{12} & 0 & K_{12}-\omega^2 m_2 \end{bmatrix} \begin{bmatrix} y_1 \\ \alpha \\ y_2 \end{bmatrix} = \begin{bmatrix} 0 \\ 0 \\ F \end{bmatrix}$$

Solving for $y_1$ and $y_2$ of the restrained system:

$$y_1/F = \dfrac{K_{12}}{(K_{12}-\omega^2 m_1)(K_{12}-\omega^2 m_2)-K_{12}^2+(K_{12}-\omega^2 m_2)\left(K-\dfrac{I_x}{r^2}\omega^2-\dfrac{I_z}{r^2 I_y}\Omega^2\right)}$$

$$y_2/F = \dfrac{(K_{12}-m_1\omega^2)+K-\omega^2\dfrac{I_x}{r^2}-\dfrac{I_z}{I_y r^2}\Omega^2}{(K_{12}-\omega^2 m_1)(K_{12}-\omega^2 m_2)-K_{12}^2+(K_{12}-\omega^2 m_2)\left(K-\dfrac{I_x}{r^2}\omega^2-\dfrac{I_z}{r^2 I_y}\Omega\right)}$$

The equation of motion of the unrestrained system of FIG. 5b becomes:

$$\begin{bmatrix} K-m_1\omega^2 & -K \\ -K & K-m_2\omega^2 \end{bmatrix}\begin{bmatrix} y_1 \\ y_2 \end{bmatrix}=\begin{bmatrix} 0 \\ F \end{bmatrix}$$

Solving for $y_1$ and $y_2$ in the unrestrained system:

$$y_1/F = \dfrac{K_{12}}{(K_{12}-m_1\omega^2)(K_{12}-m_2\omega^2)-K_{12}^2}$$

$$y_2/F = \dfrac{K_{12}-m_1\omega^2}{(K_{12}-m_1\omega^2)(K_{12}-m_2\omega^2)-K_{12}^2}$$

In comparing $y_1$ and $y_2$ of the restrained and unrestrained systems, it will be seen that the equations of motion are identical when $$\omega^2 = \dfrac{I_z^2}{I_x I_y}\Omega^2 - \dfrac{Kr^2}{I_x}$$

Figure 6:
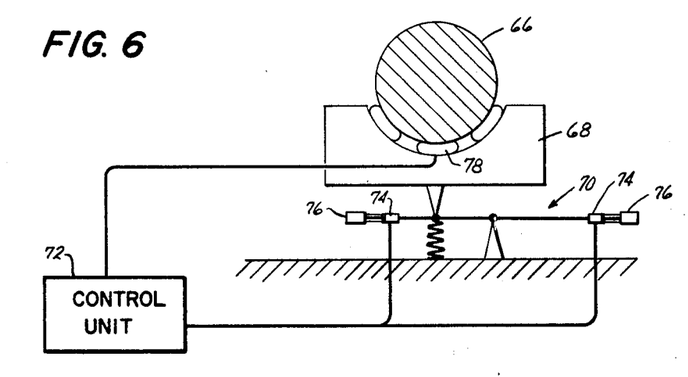
FIG. 6 is a schematic representation of a vibration testing system comprising a somewhat different form of the invention as compared to the system of FIG. 1.

Therefore, by properly selecting the angular speed $\Omega$ of the gyro disc this condition may be satisfied, and when satisfied the movements of the specimen on the test mount will be identical with the movements of the specimen in the unrestrained system. The test mount, therefore, exerts a zero impedance on the test specimen. In this analysis of the gyroscopic test mount of FIG. 5a, the tare mass has been neglected, but if the tare mass is included it can be shown to be capable of being "tuned out" of the test system, similar to the manner in which the tare mass $m'$ may be tuned out of the system of FIG. 4a.

Where the tare effects of the form blocks and/or other parts used for holding a test specimen on the test mount are of importance a slightly different form of control, as shown in FIG. 6, may be used for tuning the test mounts. In this figure, a test specimen 66 is supported vertically by a contour block 68 which in turn is fixed to and supported from the ground by an antiresonant test mount indicated at 70, which for the purpose of illustration, is shown to be generally similar to the test mount of FIG. 2. A control unit 72 is provided for controlling the operation of motors 74, 74 which move the auxiliary masses 76, 76 to vary the moment of inertia of the auxiliary mass system. A suitable shaker, or other means, not shown, is used to vibrate the test specimen 70 on the test mount.

Instead of the control unit 72 of FIG. 6 being responsive to the frequency of vibration of the test specimen, as in the FIG. 1 system, the system of FIG. 6 includes at least one force sensor 78 interposed between the contour block and the test specimen. This force sensor senses the vibrating component of the force transmitted between the test specimen and the contour block and produces an alternating output voltage or similar signal related to the vibrating force. The control unit 72 in turn operates in response to the sensor output signal to move the auxiliary masses 76, 76 in such a direction as to reduce the magnitude of the signal. That is, the auxiliary masses are moved by the control unit so as to maintain the vibratory force transmitted between the specimen and the contour block at a zero value. When this condition occurs the test specimen experiences no dynamic restraint from the contour block and its dynamic response is similar to that of a dynamically unrestrained specimen.

FIGS. 1, 2 and 3 show test mounts and systems capable of isolating vibrations occurring in two dimensions while the analysis presented in connection with the FIGS. 4a and 4b and FIGS. 5a and 5b relate to one dimension only. It will be appreciated, however, that similar and identical analysis may be made with regard to the second dimension in which the test mounts of FIGS. 1, 2 and 3 are capable of operating. It will also further be appreciated by properly arranging and supporting a number of two-dimensional test mounts, such as either of the test mounts of FIGS. 2 and 3, a test fixture may be provided for isolating vibrations occurring in any of three dimensions. Such a test fixture is shown, by way of example, in FIGS. 7, 8 and 9 as applied to the support of a test specimen in the form of a spacecraft 80.

Figure 7:
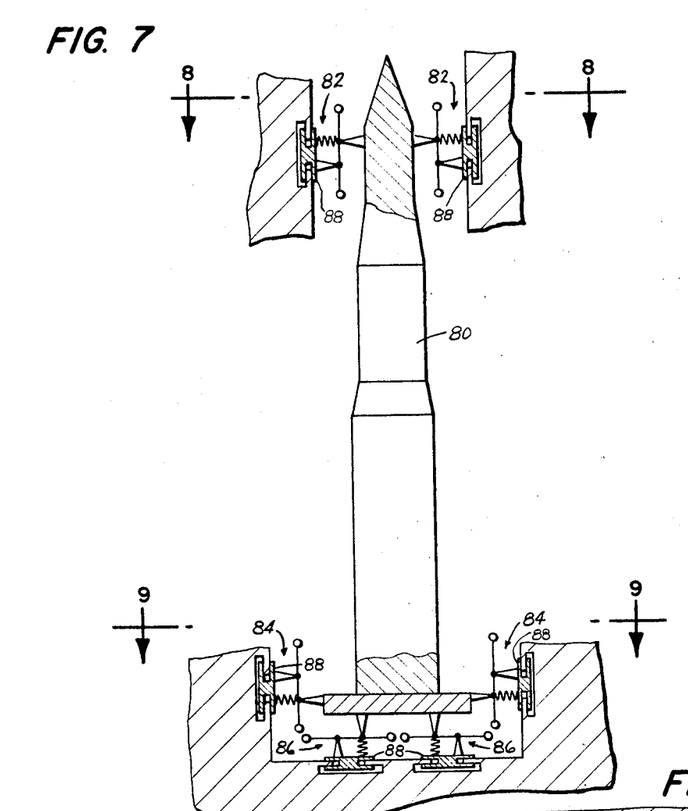
FIG. 7 is a generally schematic representation of a test fixture embodying the present invention and particularly adapted to permit movement of the test specimen in three dimensions.
Figure 8:
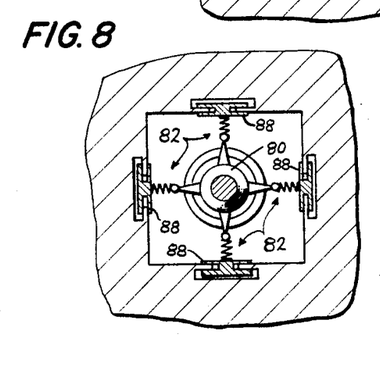
FIG. 8 is a sectional view taken on the line 8—8 of FIG. 7.
Figure 9:
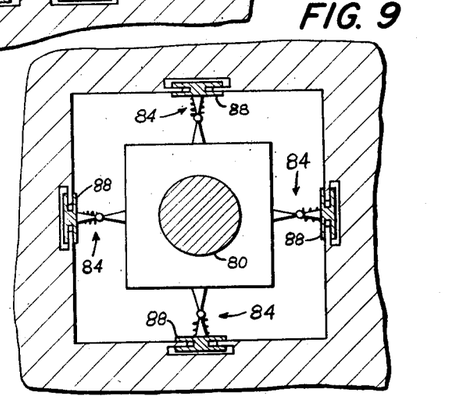
FIG. 9 is a sectional view taken on the line 9—9 of FIG. 7.

Referring to FIGS. 7, 8 and 9, a number of two-dimensional test mounts are shown at 82, 82, 84, 84 and 86, 86. Each of these test mounts is or may be similar, for example, to either one of the two test mounts shown in FIGS. 2 and 3. The missile or spacecraft 80 is oriented with its longitudinal axis vertical and the four test mounts 82, 82 as shown best in FIG. 8, engage the nose of the spacecraft and statically restrain its movement in any direction in a horizontal plane. Similarly, four other test mounts 84, 84 shown best in FIG. 9, engage the base of the spacecraft and statically restrain its movement in any direction in another horizontal plane. The two other test mounts 86, 86 of FIG. 7 statically vertically support the spacecraft. In order to allow for three-dimensional vibration, each of the test mounts 82, 82, 84, 84, 86 and 86 includes a base 88 which is constrained to movement in a plane fixed relative to the earth or other fixed supporting structure. In the test fixture of FIGS. 7, 8 and 9, the test mounts 82, 82 and 84, 84 are constrained to movement in vertical planes and the two test mounts 86, 86 are constrained to movement in horizontal planes. The actual means for so constraining the movement of the test mount bases 88, 88 preferably include anti-friction devices so as to permit the test mounts to move freely in their planes of movement with little or no frictional restrain. For simplicity, however, the connecting means have been shown to comprise simple sliding connections. In considering FIGS. 7, 8 and 9, it will be observed that the arrangement of the test mount is such that although each test mount is itself capable of isolating vibrations in only two directions, it is also free to move relative to the ground or to the other fixed supporting structure to accommodate the movement of it and the test specimen in a third direction, which latter movement is isolated or handled by other test mounts. And it will, of course, be further understood that by properly tuning the test mounts of FIGS. 7, 8 and 9, the test mounts may be made to have little or no dynamic restraint on the test specimen so that the dynamic response of the specimen will be similar to its response in free flight.

In again referring to FIGS. 7, 8 and 9, it will further be noted the arrangement of the isolators or test mounts is such that they need not necessarily be two dimensional, and if desired each isolator could be a one dimensional isolator.

Having now described the structure and operation of the vibration test systems and test mounts shown in FIGS. 1 through 9, the method of vibration testing using these systems and mounts may be briefly described by noting that it consists of the steps of restraining a vibration test specimen relative to the ground by a vibration isolator of the type which exhibits a zero impedance at a given frequency of vibration. Such a vibration isolator may be constructed as shown in either FIGS. 2 or 3 of the drawings and is referred to as an antiresonant vibration isolator. That is, the isolator has one antiresonant frequency at which the transmissibility of dynamic forces through the isolator is equal to zero. If this antiresonant frequency is the same as the frequency of vibration of the test specimen, then the isolator has no impedance or dynamic restraint on the test specimen. In cases where the test specimen is always vibrated at the same freqeuncy, the vibration isolator may be designed to have a fixed antiresonant frequency equal to the frequency of vibration. In cases where the test specimen is vibrated over a range of frequencies the vibration isolator provided is one which is capable of being tuned to different antiresonant frequencies, and during the running of a test the tuning of the isolator is changed in accordance with changes in the frequency of vibration of the test specimen. This may be accomplished by making corresponding adjustments in the tuning of the isolator as the frequency of vibration is adjusted or by sensing the actual frequency of vibration of the test specimen and varying the tuning of the isolator in accordance with the measured frequency of vibration. Alternatively, a force sensor may be placed between the test specimen and the mounting member of the isolator and the vibration isolator tuned until the amplitude of the vibratory force sensed by the force sensor is eliminated or minimized. In cases where it is desirable to permit the test specimen to move or vibrate in two coordinate dimensions at one time, the vibration isolator or isolators used for restraining the test specimen are preferably two-dimensional isolators arranged so as to isolate in the two directions in which the specimen is permitted to move or vibrate. In cases where three-dimensional freedom of movement is desired, the isolators may be arranged as shown in FIGS. 7, 8 and 9 with each isolator having its base constrained to movement in a plane so as to accommodate movement of the specimen in a third direction in addition to movement in the two coordinate directions normally permitted by the isolator.

The invention claimed is:

1. Apparatus for vibration testing a given specimen on the ground, said apparatus comprising a mount for restraining the vibratory movement of said specimen in one direction relative to the ground, said mount having an antiresonant frequency at which a substantially zero vibratory force is transmitted from said specimen to the ground as a result of vibration of said specimen in said one direction, means included in said mount for varying said antiresonant frequency, means for developing a signal related to a given characteristic of the vibration of said test specimen said one direction, and means responsive to said signal for controlling said antiresonant frequency varying means to cause said antiresonant frequency to vary with changes in said given characteristic.

2. Apparatus for vibration testing a given specimen on the ground, said apparatus comprising a mount for restraining the vibratory movement of said specimen in one direction relative to the ground, said mount having an antiresonant frequency at which a substantially zero vibratory force is transmitted from said specimen to the ground as a result of vibration of said specimen in said one direction, means included in said mount for varying said antiresonant frequency, means for developing a signal related to the frequency of the vibration of said test specimen in said one direction, and means responsive to said signal for controlling said antiresonant frequency varying means to maintain said antiresonant frequency substantially equal to said frequency of vibrtaion.

3. Apparatus for vibration testing a given specimen on the ground, said apparatus comprising a mount for restraining the vibratory movement of said specimen in one direction relative to the ground, said mount having an antiresonant frequency at which a substantially zero vibratory force is transmitted from said specimen to the ground as a result of vibration of said specimen in said one direction, means included in said mount for varying said antiresonant frequency, a force sensor interposed between said specimen and said mount for developing a signal related to the force transmitted between said specimen and said mount as a result of the vibration of said test specimen in said one direction, and means responsive to said signal for controlling said antiresonant frequency varying means to maintain the vibratory force detected by said sensor at a minimum value.

4. Apparatus for vibration testing a given specimen on the ground, said apparatus comprising at least one vibration isolator for isolating the vibratory movement of said specimen in one direction relative to the ground, said vibration isolator including means located between said specimen and the ground and including a spring for providing a resilient resistance to movement of said specimen relative to the ground in said one direction, auxiliary inertia means, means connecting said auxiliary inertial means to both said specimen and the ground so as to be moved relative to both said specimen and the ground in response to movement of said specimen relative to the ground and so that said isolator has a frequency response to vibrations occurring in said given direction including an antiresonance appearing at a frequency dependent on the spring constant of said spring means and on the effective inertia of said auxiliary inertia means and at which antiresonant frequency a vibratory force of minimum amplitude is transmitted between said specimen and the ground, and means for varying the effective inertia of said auxiliary inertia means; means for developing a signal related to a given characteristic of the vibration of said test specimen in said one direction; and means responsive to said signal for controlling said means for varying the effective inertia of said auxiliary inertia means to cause said antiresonant frequency to vary with changes in said given characteristic of the vibration.

5. Apparatus for vibration testing a given specimen on the ground, said apparatus comprising at least one vibration isolator for restraining the vibratory movement of said specimen in one direction relative to the ground, said vibration isolator including means located between said specimen and the ground and including a spring for providing a resilient resistance to movement of said speciment relative to the ground in said one direction, an auxiliary mass, a support for said auxiliary mass, means pivotally connecting said support to both said specimen and the ground so as to be moved relative to both said specimen and the ground, and means for moving said auxiliary mass along said support to vary the vibration isolating characteristic of said isolator; means for developing a signal related to a given characteristic of the vibration of said test specimen in said one direction; and means for controlling the operation of said means for moving said auxiliary mass along said support in response to said signal so as to vary said vibration isolating characteristic of said isolator in accordance with changes in said given characteristic of the vibration of said test specimen in said one direction.

6. Apparatus for vibration testing a given specimen on the ground, said apparatus comprising at least one vibration isolator for restraining the vibratory movement of said specimen in one direction relative to the ground, said vibration isolator including means located between said specimen and the ground and including a spring for providing a resilient resistance to movement of said specimen relative to said ground in said one direction, an arm pivotally connected to both said specimen and the ground so as to be moved relative to both said specimen and the ground in response to movement of said specimen relative to the ground, a bracket rotatably connected to one end of said arm for rotation about the longitudinal axis of said arm, and a gyro disc rotatably supported on said bracket for rotation about an axis normal to the longitudinal axis of said arm, the speed of rotation of which gyro disc determines the vibration isolating characteristic of said isolator; means for developing a signal related to a given characteristic of the vibration of said test specimen in said one direction; and means for varying the speed of said gyro disc in response to said signal so as to vary said vibration isolating characteristic of said isolator in accordance with changes in said given characteristic of the vibration of said test specimen in said one direction.

7. Apparatus for vibration testing a given specimen on the ground, said apparatus comprising at least one vibration isolator for restraining the vibratory movement of said specimen in one direction relative to the ground, said vibration isolator including means located between said specimen and the ground and including a spring for providing a resilient resistance to movement of said specimen relative to said ground in said one direction, an arm pivotally connected to both said specimen and the ground so as to be moved relative to both said specimen and the ground in response to movement of said specimen relative to the ground, a bracket rotatably connected to one end of said arm for rotation about the longitudinal aixs of said arm, a gyro disc rotatably supported on said bracket for rotation about an axis normal to the longitudinal axis of said arm, the speed of rotation of which gyro disc determines the vibration isolating characteristic of said isolater, and a variable speed motor on said bracket for driving said gyro disc; means for developing a signal related to a given characteristic of vibration of said test specimen in said one direction, and means for controlling the speed of said motor in response to said signal so as to vary said vibration isolating characteristic of said isolator in accordance with changes in said given characteristic of the vibration of said test specimen in said one direction.

8. A vibration isolator for dynamically isolating one body from another body with regard to relative movement of said bodies occurring in one direction, said vibration isolator comprising means located between said bodies and including a spring for providing a resilient resistance to said relative movement of said two bodies in said one direction, an arm pivotally connected to both of said bodies so as to be moved relative to both of said bodies in response to said relative movement of said two bodies in said one direction, a bracket rotatably connected to one end of said arm for rotation about the longitudinal axis of said arm, a gyro disc rotatably supported on said bracket for rotation about a spin axis normal to said arm, and means for rotating said gyro disc about its spin axis at a speed related to one characteristic of said relative movement of said bodies.

9. A vibration isolator as defined in claim 8 further characterized by said means for rotating said gyro disc comprising a variable speed motor carried by said bracket.

10. A vibration isolator as defined in claim 8 further characterized by said arm being universally connected to each of said bodies, a second bracket rotatably connected to the other end of said arm for rotation about the longitudinal axis of said arm, a second gyro disc rotatably supported on said second bracket for rotation about a spin axis normal to said arm, and means for rotating said second gyro disc about its spin axis.

11. A vibration isolator as defined in claim 10 further characterized by two means each associated with a respective one of said brackets for biasing said brackets to given neutral positions relative to said arm, said neutral positions being such that when said brackets are in said neutral positions said two spin axes of said gyro discs are oriented at approximately 90° to each other.

References Cited
FOREIGN PATENTS

| | | |
|---|---|---|
| 130,227 | 7/1962 | U.S.S.R. |
| 530,853 | 12/1940 | Great Britain. |
| 821,858 | 10/1959 | Great Briitain. |

RICHARD C. QUEISSER, *Primary Examiner.*

J. P. BEAUCHAMP, JR., *Assistant Examiner.*

UNITED STATES PATENT OFFICE
CERTIFICATE OF CORRECTION

Patent No. 3,393,555                                July 23, 1968

William G. Flannelly

It is certified that error appears in the above identified patent and that said Letters Patent are hereby corrected as shown below:

Column 2, line 65, "ni" should read -- in --. Column 6, line 70, the equation should appear as shown below:

$$V = 1/2 K_{12}(y_1 - y_2)^2 + 1/2 K y_1^2$$

Column 9, line 51, after "specimen" insert -- in --; line 68, "vibrtaion" should read -- vibration --. Column 11, line 22, "aixs" should read -- axis --; line 27, "isolater" should read -- isolator --.

Signed and sealed this 13th day of January 1970.

(SEAL)
Attest:

Edward M. Fletcher, Jr.                    WILLIAM E. SCHUYLER, JR.

Attesting Officer                            Commissioner of Patents